Figure 7:
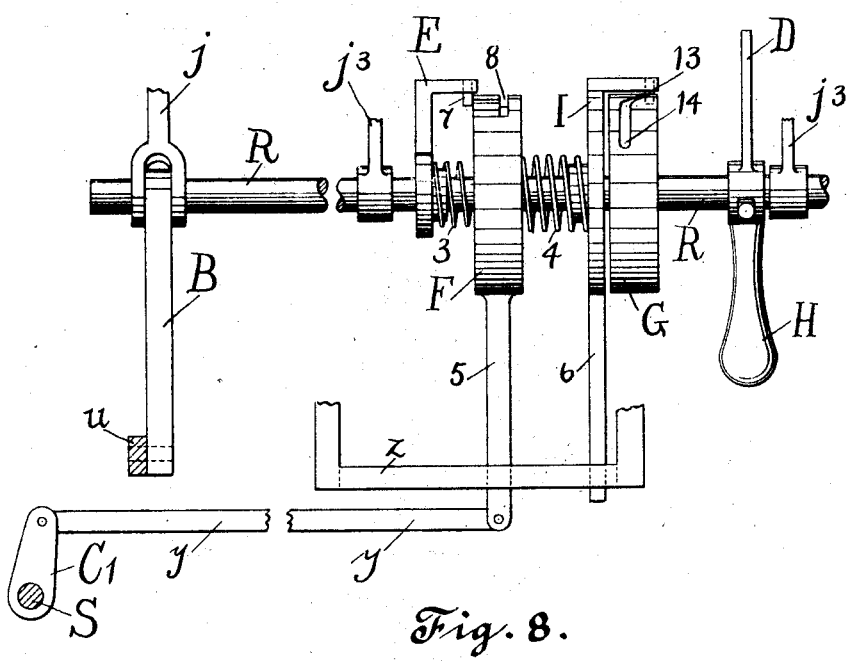

No. 666,470. Patented Jan. 22, 1901.
W. H. COOLEY.
FARE REGISTER.
(Application filed Apr. 2, 1900.)
(No Model.) 2 Sheets—Sheet 1.
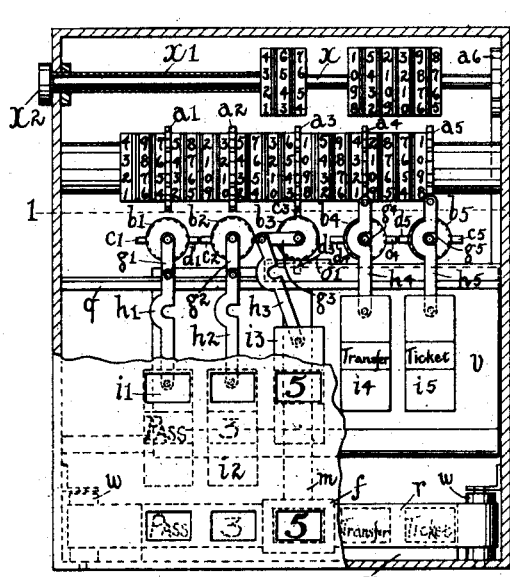
Figure 1.
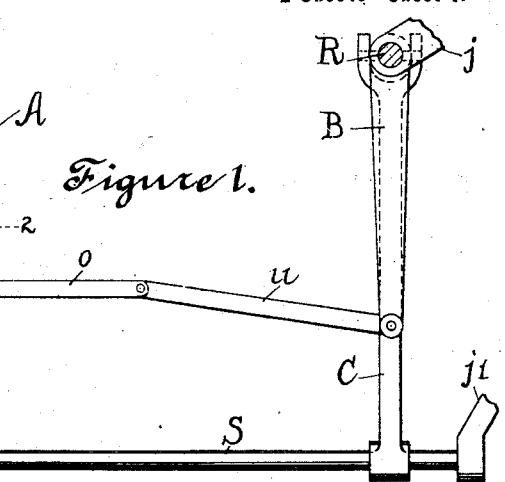
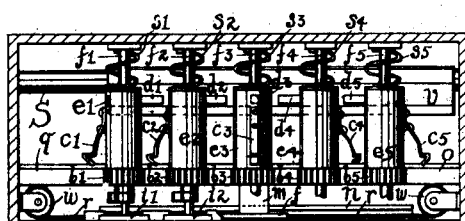
Fig. 2.
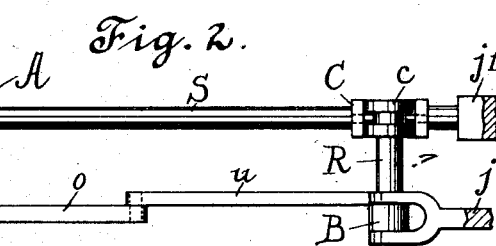
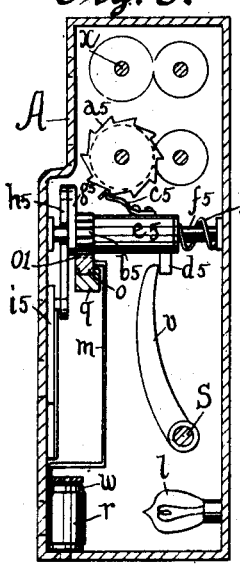
Fig. 3.
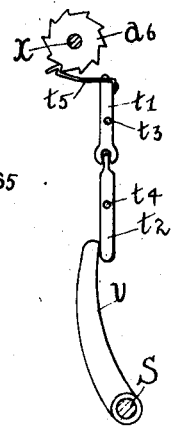
Fig. 5.
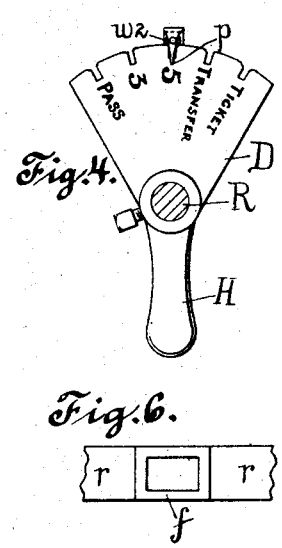
Fig. 4.
Fig. 6.
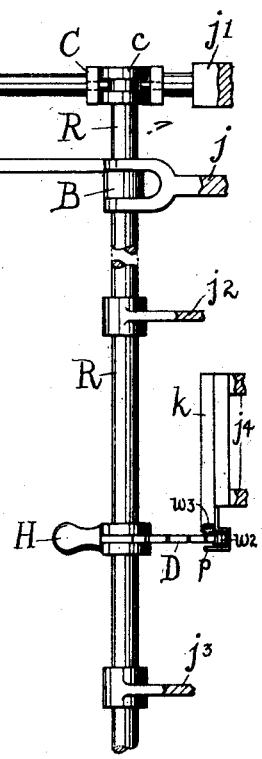
Witnesses:
Albert E. Bell.
Etha M. Smith.
Inventor
Wm. H. Cooley.
THE NORRIS PETERS CO., PHOTO-LITHO., WASHINGTON, D. C.

No. 666,470. Patented Jan. 22, 1901.
W. H. COOLEY.
FARE REGISTER.
(Application filed Apr. 2, 1900.)
(No Model.) 2 Sheets—Sheet 2.

Witnesses:
Albert C. Bell.
Etha M. Smith

Inventor
Wm. H. Cooley.

THE NORRIS PETERS CO., PHOTO-LITHO., WASHINGTON, D. C.

UNITED STATES PATENT OFFICE.

WILLIAM H. COOLEY, OF BROCKPORT, NEW YORK.

FARE-REGISTER.

SPECIFICATION forming part of Letters Patent No. 666,470, dated January 22, 1901.

Application filed April 2, 1900. Serial No. 11,157. (No model.)

*To all whom it may concern:*

Be it known that I, WILLIAM H. COOLEY, a citizen of the United States, residing at Brockport, in the county of Monroe and State of New York, have invented a new and Improved Fare-Register, of which the following is a specification.

One object of my invention is the construction of a fare-register and an operating mechanism therefor such that by one movement of a single rod the actuating mechanism for any desired individual section of the fare-register shall be brought into operative relation with a common operating device on the rod, whereby such rod by its other motion may be caused to actuate the desired individual fare-registering mechanism.

Another object of my invention is to provide means whereby the operation of any one of the individual register-actuating devices shall serve to actuate its corresponding individual register only when the corresponding fare indication is given.

A further object of my invention is to provide two coöperating systems of fare indications, one of which shall be capable of being illuminated and more especially adapted to use at night.

The accompanying drawings, illustrating my invention, are as follows:

Figure 1 is a face view of my fare-register with a portion of the front side of the case therefor removed, so as to show the interior mechanism. In this view the operating-rod R is shown in section. Fig. 2 is a top view of the operating mechanism for my fare-register, showing the fare-register itself in sectional view taken along the line 1 2 of Fig. 1, while Fig. 3 shows a side view of my register with the right-hand side of the casing removed and looking at the same from the right-hand side. Figs. 4, 5, 6, 7, 8, 9, and 10 illustrate details of construction, as will be explained.

Similar characters refer to similar parts throughout the several views.

Referring to the drawings, A is the case of my register. Rotating in bearings formed in the right and left hand sides of the case of my register and near the top thereof is seen the shaft $x$, carrying the permanent total and trip registering mechanism. The bearing for the left-hand end of this shaft consists in a rotatable tube $x'$, which extends through the case and to the right far enough to be made use of as a resetting device by means of the handle $x^2$ thereon, seen just outside of the left-hand side of the case. The permanent total-registering mechanism (seen near the right-hand end of this shaft $x$) is never intended to be reset, while the trip-registering mechanism (seen at the middle of this shaft $x$) is arranged to be reset, by means of the handle $x^2$, in the manner usual in such mechanisms. As any suitable form of registering or counting mechanism may be made use of, I have shown such register-wheels only in outline in all the drawings.

$a'$, $a^2$, $a^3$, $a^4$, and $a^5$ each constitutes the actuating-wheel for a separate and distinct system of registering-wheels, as indicated. These combined systems of registering-wheels may receive their support from the sides of the case A in the manner indicated.

A series of shafts $f'$ $f^2$ $f^3$ $f^4$ $f^5$, as seen in Figs. 1, 2, and 3, are rotatably supported from the front and rear sides of the case A. To avoid confusion, the letters of reference $f'$ $f^2$ $f^3$ $f^4$ $f^5$ are omitted from Fig. 1. On these shafts $f'$ $f^2$ $f^3$ $f^4$ $f^5$ are secured spur-gears $b'$ $b^2$ $b^3$ $b^4$ $b^5$, respectively, and also cranks $g'$ $g^2$ $g^3$ $g^4$ $g^5$. On these shafts $f'$ $f^2$ $f^3$ $f^4$ $f^5$ are seen also the cylinders $e'$ $e^2$ $e^3$ $e^4$ $e^5$, respectively, upon which are secured the spring-pawls $c'$ $c^2$ $c^3$ $c^4$ $c^5$, each arranged when occupying a vertical position, such as indicated at $c^3$ in Figs. 1 and 2 and at $c^5$ in Fig. 3, to engage its corresponding actuating-wheel $a'$ $a^2$ $a^3$ $a^4$ $a^5$ for one of the individual fare-registering mechanisms. Pivoted to each one of these crank-arms $g'$ $g^2$ $g^3$ $g^4$ $g^5$ are seen the curved connecting-rods $h'$ $h^2$ $h^3$ $h^4$ $h^5$, respectively, each carrying a suitable slide or tablet $i'$ $i^2$ $i^3$ $i^4$ $i^5$, bearing the fare indications "Pass," "3," "5," "Transfer," and "Ticket," respectively. These sliding tablets $i'$ $i^2$ $i^3$ $i^4$ $i^5$ are arranged to work in suitable guides, as indicated in Figs. 1 and 3, formed on the rear side of the front of the case A. The fare indications on these tablets $i'$ $i^2$ $i^3$ $i^4$ $i^5$, as seen, are located on the middle of such tablets and are arranged to be exposed through a series of openings in the front of the case A and near the middle thereof when such tablets occupy positions midway of their movements—that is, with their corresponding crank-arms $g'$ $g^2$ $g^3$ $g^4$ $g^5$ in the horizontal position, such as seen at $g^3$ in Fig. 1; but when such crank-arms occupy the vertical position, either at the extreme top or bottom of their movement, then such fare indications are concealed behind the front piece of the case A and blank spaces only on such tablets $i'$ $i^2$ $i^3$ $i^4$ $i^5$ are exposed to view. The curved construction of the connecting-rods $h'$ $h^2$ $h^3$ $h^4$ $h^5$ is such as to admit of a complete half-revolution of the cranks $g'$ $g^2$ $g^3$ $g^4$ $g^5$ when actuated by the spur-gears $b'$ $b^2$ $b^3$ $b^4$ $b^5$, each one of which is arranged to receive just one-half of a revolution from the movement thereunder of the rack $o'$ on the bar $o$. Each of these cylinders $e'$ $e^2$ $e^3$ $e^4$ $e^5$, respectively, is arranged to rotate with its corresponding shaft $f'$ $f^2$ $f^3$ $f^4$ $f^5$ by means of any suitable mechanism (not shown)—such, for instance, as splines on the shafts $f'$ $f^2$ $f^3$ $f^4$ $f^5$, coöperating with feathers in these cylinders $e'$ $e^2$ $e^3$ $e^4$ $e^5$, respectively. On the side of each one of these cylinders $e'$ $e^2$ $e^3$ $e^4$ $e^5$ opposite the spring-pawls $c'$ $c^2$ $c^3$ $c^4$ $c^5$, respectively, there is seen a projecting arm $d'$ $d^2$ $d^3$ $d^4$ $d^5$, arranged to be engaged by the operating-vane $v$, secured upon the shaft S. This vane $v$ when operated by the rotation of the shaft S, moving such vane toward the rear of the case A, carries with it that one of the cylinders $e'$ $e^2$ $e^3$ $e^4$ $e^5$ on which the projecting arm $d'$ $d^2$ $d^3$ $d^4$ $d^5$ at that time happens to project downward so as to lie in the path of the vane $v$. Spiral springs $s'$ $s^2$ $s^3$ $s^4$ $s^5$ serve to keep the cylinders $e'$ $e^2$ $e^3$ $e^4$ $e^5$ firmly up against the gears $b'$ $b^2$ $b^3$ $b^4$ $b^5$, respectively, when not operated upon by this operating-vane $v$. Such spiral springs serve also by the friction they produce between the washers at the rear end of the cylinders $e'$ $e^2$ $e^3$ $e^4$ $e^5$ and the rear end of such cylinders to hold such gears $b'$ $b^2$ $b^3$ $b^4$ $b^5$ and crank-arms $g'$ $g^2$ $g^3$ $g^4$ $g^5$ in position at either extreme of their movements. This friction is sufficient to hold such cylinders, crank-arms, and gears in position at each extreme of their movements when not acted upon by the vane $v$. It will be noticed that when such cylinders are acted upon by the vane $v$ engaging their projecting arms $d'$ $d^2$ $d^3$ $d^4$ $d^5$ they are always held in position by the rack $o'$ on the bar $o$. The spur-gears $b'$ $b^2$ $b^3$ $b^4$ $b^5$ are arranged to be actuated by the rack $o'$, secured upon the horizontally-moving bar $o$, which works in a suitable guide-piece $q$. The length of this rack $o'$ on the bar $o$ is such as to give to each one of the spur-gears $b'$ $b^2$ $b^3$ $b^4$ $b^5$ just one-half of a complete rotation by means of the passage of such rack $o'$ under such gear in either direction. This bar $o$ carries also, by means of a downward-extending arm $m$, an open frame-piece of metal $f$, to each side of which is secured a heavy silk ribbon $r$. Each of these ribbons $r$ is secured also to a spring-roller $w$, as seen, arranged to take up the slack of these ribbons on each side of the center frame $f$ when this frame $f$ is, by means of the bar $o$, moved either to the right or to the left. Near the bottom of the front piece of the case A there is seen a second series of openings—five in number—arranged to register with the opening in this frame-piece $f$ when the same is in the position which it is caused to assume by the operation of the bar $o$ when such bar has brought (by means of the rack $o'$ thereon engaging the pinions $b'$ $b^2$ $b^3$ $b^4$ $b^5$) the projections $d'$ $d^2$ $d^3$ $d^4$ $d^5$ into operative relation with the actuating-vane $v$ and the spring-pawls $c'$ $c^2$ $c^3$ $c^4$ $c^5$ into operative relation, respectively, with the actuating-wheels $a'$ $a^2$ $a^3$ $a^4$ $a^5$ of the several series of registering-wheels—that is to say, the opening in this frame-piece $f$ is opposite the extreme left-hand opening in this second or lower series when the rack $o'$ on the bar $o$ has brought the projection $d'$ into operative relation with the vane $v$ and the spring-pawl $c'$ into operative relation with the actuating-wheel $a'$. Similarly the opening in this frame $f$ is opposite the next to the left-hand opening in the lower series in the front of the case A when the rack $o'$ on this bar $o$ has brought the projection $d^2$ into operative relation with the actuating-vane $v$ and the spring-pawl $c^2$ into operative relation with the actuating-wheel $a^2$, and so on in this way for each of the remaining openings of the lower series in the front piece of the case A. Immediately above these openings in the front piece of the case A and near the middle thereof there is seen the first series of openings. These last-mentioned openings are just in front of the sliding tablets $i'$ $i^2$ $i^3$ $i^4$ $i^5$, and the fare indications on each of such tablets is arranged to be brought into view through this upper series of openings when the rack on the bar $o$ has brought into operative relation the projections $d'$ $d^2$ $d^3$ $d^4$ $d^5$, respectively, with the operating-vane $v$, at which time the corresponding spring-pawls $c'$ $c^2$ $c^3$ $c^4$ $c^5$, each one individually, is brought into operative relation with the actuating-wheels $a'$ $a^2$ $a^3$ $a^4$ $a^5$ of the corresponding series of individual registering-wheels. Thus it will be seen that two series of fare indications are provided, the first that constituted by the tablets $i'$ $i^2$ $i^3$ $i^4$ $i^5$ and the second that constituted by the series of corresponding fare indications which are located immediately behind the openings in the lower edge of the front piece of the case A and giving indications as "Pass," "3," "5," "Transfer," and "Ticket," printed upon a suitable fixed but transparent tablet $n$, located immediately to the rear of the ribbons $r$ and the frame $f$. It will also be seen that each system of fare indications is arranged, in the normal operation of the register, to give indications corresponding to that of the other. The fare indications of each system, it will be seen, are given only when, first, the operative position of the corresponding one of the projections $d'$ $d^2$ $d^3$ $d^4$ $d^5$ relative to the vane $v$ is secured, and, second, when the cranks $g'$ $g^2$ $g^3$ $g^4$ $g^5$ occupy a horizontal position, at which time also the spring-pawls $c'$ $c^2$ $c^3$ $c^4$ $c^5$ are brought into operative relation, respectively, with their corresponding actuating-wheels $a'$ $a^2$ $a^3$ $a^4$ $a^5$.

Behind the fixed tablet $n$ is seen a lamp $l$, arranged to give light through the tablet $n$ and the opening in the frame $f$ and that one of the lower series of indicator-openings in the front piece of the case A with which such frame $f$ happens at any time to register, thus affording an illuminated indication for use at night.

Referring now to Fig. 5, which shows in detached view the actuating mechanism for the total-registers in operative relation and with the right-hand side of the case A removed, $a^6$ is a ratchet-wheel secured upon the shaft $x$, carrying the permanent total-register and the trip-register. A spring-pawl $t^5$ is arranged to engage and actuate this ratchet-wheel $a^6$ and is carried upon the upper end of the lever $t'$, working on a pivot $t^3$ in the right-hand side of the case A. This lever $t'$ articulates with a second lever $t^2$, swinging upon a suitable pin or stud $t^4$, also secured in the right-hand side of the case A, and this lever $t^2$ is arranged to be engaged and operated by the vane $v$. The bar $o$ is arranged to be actuated from the crank B by means of a connecting-rod $u$. The crank B is splined upon the rod R and is prevented from longitudinal motion with such rod R by being located between the arms of the forked bracket $j$, whereby the rotary motion of the rod R imparts a horizontal motion to the bar $o$ independently of the longitudinal movement of the rod R. On the end of this rod R is secured the grooved collar $c$, which is arranged (by means of the pins in the bifurcated upper end of this crank C engaging the groove in this collar $c$) to actuate the crank-arm C, secured to the shaft S, whereby a longitudinal movement of this rod R imparts a rotary motion to this shaft S. The right-hand end of this shaft S is supported in a bracket $j'$, and the rod R is supported in suitable brackets $j$, $j^2$, and $j^3$. These brackets may be secured in any suitable manner to the roof or side of the car in such a way that the rod R shall occupy a horizontal position when the parts are in the position indicated in the drawings and with the register A located at the desired height at the end of the car. A suitable handle H, carrying the indicating-sector D, is secured to the shaft R at any suitable point by means of a set-screw, as indicated. In the periphery of this sector D are formed notches, which admit of the longitudinal movement of the shaft D when any one of such notches registers with the key-bar $k$, carried by the bracket $j^4$. Also carried by this bracket $j^4$ is seen a spring-pointer $p$, carrying a roller $w^2$. The function of this roller $w^2$ is to hold lightly the sector D, with the slots seen in the circular periphery thereof, in operative relation, any one of them, with this key-bar $k$. A pointer carried on the end of this spring $p$ is arranged to point to a series of indications carried by this sector D, one of them opposite each of the notches in the segmental periphery thereof. The indications on the sector D are so arranged that when each one of them is brought opposite the spring-pointer $p$ the corresponding fare thereby indicated is also indicated by each of the fare-indicators in the register, and also at the same time the corresponding one of the projections $d'$ $d^2$ $d^3$ $d^4$ $d^5$ is brought into operative relation with the vane $v$, and also the corresponding one of the spring-pawls $c'$ $c^2$ $c^3$ $c^4$ $c^5$ will be brought into operative relation with the actuating-wheel $a'$ $a^2$ $a^3$ $a^4$ $a^5$ of the corresponding individual register. A roller $w^3$, located in the end of the key-bar $k$, is made use of to facilitate the entrance of the key-bar $k$ into each one of the slots in the periphery of the sector D.

In the operation of my fare-register the conductor after having received a fare moves the handle H so as to bring the corresponding fare indication on the sector D under the spring-pointer $p$, when the roller $w^2$ will enter the enlarged upper end of the corresponding slot in this sector D and serve to lightly hold the rod R in the desired position of angular adjustment, causing the desired fare indication to be exposed in each series of fare indications in the register A. Then the conductor will push the rod R by means of the handle H toward the end of the car in which the register A is located, causing the corresponding individual registering mechanism to be operated, and at the same time the trip and permanent total registers also will be operated in the following manner, namely: The rotative movement of the rod R causes the bar $o$ to move over to the right or to the left, according to the previous position of the handle H, until the rack $o'$ on this bar $o$ has operated the desired one of the spur-gears $b'$ $b^2$ $b^3$ $b^4$ $b^5$, thereby causing the desired fare indication on one of the tablets $i'$ $i^2$ $i^3$ $i^4$ $i^5$ to be exposed and at the same time bringing the opening in the frame $f$ into registry with the proper opening near the lower edge of the front piece of the case A of the register, thus exposing to view that one of the lower series of fare indications corresponding to that one of the fare indications on the tablets $i'$ $i^2$ $i^3$ $i^4$ $i^5$ that is at this time exposed. At the same time the corresponding projection $d'$ $d^2$ $d^3$ $d^4$ $d^5$ on one of the cylinders $e'$ $e^2$ $e^3$ $e^4$ $e^5$ has been brought into position to be engaged by the operating-vane $v$ on the shaft S, and at this same time also the corresponding one of the spring-pawls $c'$ $c^2$ $c^3$ $c^4$ $c^5$ is brought into position to engage the proper one of the actuating-wheels $a'$ $a^2$ $a^3$ $a^4$ $a^5$, so that when this vane $v$, located upon the shaft S, is moved to the rear of the register by the longitudinal movement of the rod R, communicated to such shaft S through the crank C in the manner already described, the desired individual fare is registered. At this same time also the right-hand end of the vane $v$ engages the lever $t^2$, articulating with the lever $t'$, carrying the spring-pawl $t^5$ and engaging the actuating-wheel $a^6$ of the trip and permanent total registers. The rod R may be returned to the position shown in the drawings by the hand of the operator, or a suitable spring (not shown) may be provided for that purpose. For the registration of a second fare of the same value or kind no angular motion of the handle H is required, but simply a longitudinal motion of the rod R by means of this handle H, this handle H being moved so as to rotate the rod R only when any fare is of a different value or kind from that last registered.

Attention is called to the fact that even in case the cylinders $e'$ $e^2$ $e^3$ $e^4$ $e^5$ are each and all of them operated at the time of each movement of the vane $v$ to the rear of the register A by means of a continuous flange on such cylinders $e'$ $e^2$ $e^3$ $e^4$ $e^5$ in place of the projections $d'$ $d^2$ $d^3$ $d^4$ $d^5$ only the desired one of the actuating-wheels $a'$ $a^2$ $a^3$ $a^4$ $a^5$ will be engaged.

Figure 8:
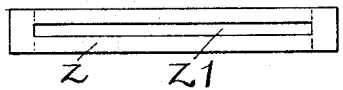
Figure 9:
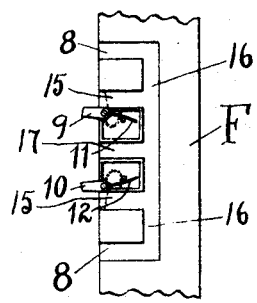
Figure 10:
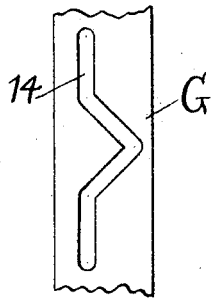

Referring now to Figs. 7, 8, 9, and 10, Fig. 7 shows in a side view a modified form of operating mechanism for my register, while Fig. 8 shows a top view of the guide-bar $z$ of Fig. 7. Fig. 9 shows the upper surface of the cam-wheel F of Fig. 7 straightened out, while Fig. 10 is a similar view of the upper surface of the cam-wheel G. In this modification of my operating device the operating-rod R is arranged to receive only rotary motion in the brackets $j^3$. The operation of the crank B is the same in this modification as in that already described. In this case, however, the rotation of the rod R by means of the handle H carries with it the cam-wheel G, having on its upper surface a cam-slot 14 of the conformation clearly indicated in an enlarged view in Fig. 10. In this cam-slot 14 a pin 13 is arranged to work in such a way as to impart a longitudinal motion to the disk I when this rod R is rotated. This disk I has a horizontal projection at its upper end, to which this pin 13 is secured. An arm 6 extends downward from this disk I and works in the slot $z'$ in the guide-bar $z$ in such a way as to prevent a rotation of the disk I under the influence of the rod R and the cam-wheel G. This cam-wheel G is rigidly secured upon the rod R, while the disk I is capable of longitudinal motion upon this rod R, and the rod R is freely rotatable also within this disk I. A sliding cam-wheel F is arranged to move longitudinally upon the rod R and is prevented from rotating with this rod R by means of the arm 5, extending downward from this cam-wheel F and also working in the slot $z'$ in the guide-bar $z$. This guide-bar $z$ may receive any suitable support (Not shown.) Rigidly secured upon this shaft R is seen the crank-arm E, carrying a pin 7, projecting downward from the horizontal extension seen at the upper end thereof. This pin 7 is arranged to work in the slot 16 in the sliding cam-wheel F. A spiral spring 4 is arranged to force the disk I and the sliding cam-wheel F apart longitudinally upon the rod R. A similarly-acting spring 3 tends to force the crank-arm E and this same sliding cam-wheel F apart. The cam-slot in the upper surface of this sliding cam-wheel F, as indicated in an enlarged view in Fig. 9, consists of a circumferential groove 16, extending over a portion of the upper surface of the cam-wheel F and provided with five openings 8 8 15 15 17, each extending axially out to the left-hand edge of the wheel F. The two openings 15 15, each side of the central opening 17, are arranged to be closed by latches 9 and 10, which are normally held open under the influence of the springs 11 and 12, respectively. The operation of the rod R by means of the handle H forces the disk I to the left, as seen in Fig. 7, by means of the pin 13 engaging the cam-slot 14. This results in a compression of the spring 4, and at the same time the crank-arm E is rotated with this rotating cam-wheel G. A rotation of the rod R in either direction results in a movement of the pin 7 past the central opening 17 in the cam-slot 16 on the wheel F. Such motion continued results in a closing of the latch 9 if in one direction or of the latch 10 if in the other direction in such a way as to prevent the spring 4 from forcing the cam-wheel F to the left, as seen in Fig. 7, by preventing the pin 7 from entering the slots 15, closed either by the latch 9 or by the latch 10. If, however, such motion is continued a little beyond either of such latches 9 or 10 and the handle H returned by a spring or otherwise to its neutral position, the pin 7 will strike against the latch 9 or the latch 10, as the case may be, and then enter one of the slots 15, closed by one of such latches. This will admit of the spring 4 forcing the sliding cam-wheel F out to the left, as seen in Fig. 7, (as the spring 3 is not of sufficient strength to oppose the spring 4 and prevent this action.) During the return of the handle H to its neutral position the pin 7 travels in the circumferentially-disposed cam-slot 16 on the sliding cam-wheel F. When the handle H has returned to the neutral position, the disk I is simultaneously returned to the position indicated in Fig. 7, removing the tension upon the spring 4 and allowing the spring 3 to force the sliding cam-wheel F to the right, during which time the pin 7 assumes the position indicated in Fig. 7 by passing through the central opening 17 and out from the slot 16 in the upper surface of the cam-wheel F. If, however, the rotation of the rod R, under the influence of the handle H, is carried to such a point that the pin 7 on the crank-arm E comes opposite either of the extreme outside openings 8 in the slot 16 in this cam-wheel F, then the spring 4 forces the cam-wheel F to the left, as indicated in Fig. 7, and the same operation follows in other respects, as already described, in regard to a lesser motion of such handle H. To the arm 5, extending downward from the cam-wheel F, there is connected the link $y$, which, through its connection with the upper end of the crank C' on the shaft or rod S, imparts a rotary motion to the shaft S. Attention is called to the fact that whether the rod R is rotated so as to cause the pin 7 to enter the openings 15 15, standing for the indication "Transfer" or "3 cents," or whether the rod R is rotated still further, so as to register a ticket or pass, the amount of longitudinal motion imparted to the sliding cam-wheel F is always the same for all fares that are registered by the rotary motion of the rod R. It will of course be understood that the latches 9 and 10 serve to prevent the return of the rod R to its neutral position until the pin 7 enters one of the openings 15 closed by such latches, and then, under the influence of the spring 4, the cam-wheel F is caused to assume such a position as to admit of the return of the rod R to its neutral position and also the return of all the parts to the positions indicated in Fig. 7. Attention is also called to the fact that before the rod R can commence its return movement to its neutral position the common operating-vane $v$ must always be actuated and also that such actuation of the common operating-vane $v$ can never occur until the operative relation has been established between the desired coöperating mechanisms in my register. In this modification a five-cent fare, it will be understood, is registered by a longitudinal movement only of the rod R. The rod R is so splined in the brackets $j^3$ as to be capable of rotary motion in such brackets only when occupying its neutral or central position longitudinally and so as to be capable also of longitudinal motion only when occupying its central or neutral position angularly; but upon receiving a slight longitudinal motion such rod cannot be rotated within the brackets $j^3$, nor can it be moved longitudinally after having received a slight rotary movement. The means by which this result is accomplished is so well known in the art as to call for no further illustration or description.

Attention is called to the fact that in my register there are a series of individual registering mechanisms and a corresponding series of actuating devices therefor, any one of which may or may not be in operative relation with its corresponding registering mechanism, and that the registering mechanism and its corresponding actuating device, between which there is at any time established an operative relation, is determined by the movement of the operating-handle or operating device. Attention is also called to the fact that each one of such actuating devices is operated by a common mechanism under the control of the operating-handle, so that in the claims when I refer to a "series of individual registering mechanisms" and "a corresponding series of actuating devices" it is to be understood that any one of such actuating devices may or may not be in operative relation with its corresponding registering mechanism, so that such actuating device shall, if operated, actuate its corresponding registering mechanism, according to the positions to which the handle is moved, and while the movements of the handle—any one of them—may serve to operate some one of the actuating devices, still the actuating device, which is to actuate its corresponding registering mechanism by being brought into operative relation therewith, is determined by the different positions to which the handle is moved.

What I claim is—

1. Two or more independent registering mechanisms, an operating device, and means whereby each one of two or more movements of such operating device, differing in amount but in substantially the same path leading one way from a neutral point or position, actuates a corresponding different one of such registering mechanisms.

2. Two or more independent registering mechanisms, and a corresponding series of indicators, an operating device, and means whereby each one of two or more movements of such operating device, differing in amount but in substantially the same path leading one way from a neutral point or position, actuates a corresponding different one of such registering mechanisms and also the corresponding indicator.

3. Two or more independent registering mechanisms and a total-register, an operating device, and means whereby each one of two or more movements of such operating device, differing in amount but in substantially the same path leading one way from a neutral point or position, actuates a corresponding different one of such registering mechanisms, and operates such total-register.

4. Two or more independent registering mechanisms, a handle, and means whereby each movement of such handle to a different one of two or more points in substantially the same path, leading one way from a neutral point or position, actuates a corresponding different one of such registering mechanisms.

5. Two or more independent registering mechanisms, and a corresponding series of indicators, a handle, and means whereby each movement of such handle to a different one of two or more points in substantially the same path, leading one way from a neutral point or position, actuates a corresponding different one of such registering mechanisms, and also the corresponding indicator.

6. Two or more independent registering mechanisms and a total-register, a handle, and means whereby each movement of such handle to a different one of two or more points in substantially the same path, leading one way from a neutral point or position, actuates a corresponding different one of such registering mechanisms, and operates such total-register.

7. Two or more independent registering mechanisms, an operating device, and means whereby each one of two or more angular movements of such operating device, in substantially the same direction but differing in amount, actuates a corresponding different one of such registering mechanisms.

8. Two or more independent registering mechanisms, and a corresponding series of indicators, an operating device, and means whereby each one of two or more angular movements of such operating device in substantially the same direction but differing in amount, actuates a corresponding different one of such registering mechanisms, and also the corresponding indicator.

9. Two or more independent registering mechanisms and a total-register, an operating device, means whereby each one of two or more angular movements of such operating device, in substantially the same direction but differing in amount, actuates a corresponding different one of such registering mechanisms, and operates such total-register.

10. A series of individual registering mechanisms and a corresponding series of actuating devices therefor, a handle, and means whereby each one of two or more movements of such handle, differing in amount, establishes an operative relation between that one of such individual registering mechanisms and its corresponding actuating device determined upon by the amount of such movement.

11. A series of individual registering mechanisms and a corresponding series of actuating devices therefor, a series of indicators, a handle, and means whereby each one of two or more movements of such handle, differing in amount, establishes an operative relation between that one of such individual registering mechanisms and its corresponding actuating device determined upon by the amount of such movement, and also exposes to view the corresponding indicator.

12. A series of individual registering mechanisms and a corresponding series of actuating devices therefor, a total-register, a handle, and means whereby each one of two or more movements of such handle, differing in amount, establishes an operative relation between that one of such individual registering mechanisms and its corresponding actuating device determined upon by the amount of such movement, and also operates such total-register.

13. A series of individual registering mechanisms and a corresponding series of actuating devices therefor, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement.

14. A series of individual registering mechanisms and a corresponding series of actuating devices therefor, a series of indicators, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement, and also exposes to view the corresponding indicator.

15. A series of individual registering mechanisms and a corresponding series of actuating devices therefor, a total-register, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement, and also operates such total-register.

16. A series of individual registering mechanisms, a series of actuating devices therefor, a handle, and means whereby each one of two or more movements of such handle, differing in amount, establishes an operative relation between that one of such individual registering mechanisms and its corresponding actuating device determined upon by the amount of such movement, and also operates such corresponding actuating device.

17. A series of individual registering mechanisms, a series of actuating devices therefor, a series of indicators, a handle, and means whereby each one of two or more movements of such handle, differing in amount, establishes an operative relation between that one of such individual registering mechanisms and its corresponding actuating device determined upon by the amount of such movement, and at the same time exposes to view the corresponding indicator, and also operates such corresponding actuating device.

18. A series of individual registering mechanisms, a series of actuating devices therefor, a total-register, a handle, and means whereby each one of two or more movements of such handle, differing in amount, establishes an operative relation between that one of such individual registering mechanisms and its corresponding actuating device determined upon by the amount of such movement and also operates such corresponding actuating device, and actuates such total-register.

19. A series of individual registering mechanisms, a series of actuating devices therefor, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement and also operates such corresponding actuating device.

20. A series of individual registering mechanisms, a series of actuating devices therefor, a series of indicators, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement, and at the same time exposes to view the corresponding indicator, and also operates such corresponding actuating device.

21. A series of individual registering mechanisms, a series of actuating devices therefor, a total-register, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement, and also operates such corresponding actuating device, and actuates such total-register.

22. A series of individual registering mechanisms and a corresponding series of actuating devices therefor, a handle, and means whereby each movement of such handle, to a different one of two or more predetermined points, establishes an operative relation between a different one of such individual registering mechanisms and its corresponding actuating device.

23. A series of individual registering mechanisms and a corresponding series of actuating devices therefor, a series of indicators, a handle, and means whereby each movement of such handle, to a different one of two or more predetermined points, establishes an operative relation between a different one of such individual registering mechanisms and its corresponding actuating device and exposes to view the corresponding indicator.

24. A series of individual registering mechanisms and a corresponding series of actuating devices therefor, a total-register, a handle, and means whereby each movement of such handle, to a different one of two or more predetermined points, establishes an operative relation between a different one of such individual registering mechanisms and its corresponding actuating device, and also operates such total-register.

25. A series of individual registering mechanisms and a corresponding series of actuating devices therefor, a handle, and means whereby each movement of such handle, to a different one of two or more points in substantially the same path leading one way from a neutral point or position, establishes an operative relation between a different one of such individual registering mechanisms and its corresponding actuating device.

26. A series of individual registering mechanisms and a corresponding series of actuating devices therefor, a series of indicators, a handle, and means whereby each movement of such handle, to a different one of two or more points in substantially the same path leading one way from a neutral point or position, establishes an operative relation between a different one of such individual registering mechanisms and its corresponding actuating device and exposes to view the corresponding indicator.

27. A series of individual registering mechanisms and a corresponding series of actuating devices therefor, a total-register, a handle, and means whereby each movement of such handle, to a different one of two or more points in substantially the same path leading one way from a neutral point or position, establishes an operative relation between a different one of such individual registering mechanisms and its corresponding actuating device, and operates such total-register.

28. A series of individual registering mechanisms, a series of actuating devices therefor, a handle, and means whereby each movement of such handle, to a different one of two or more predetermined points, establishes an operative relation between a different one of such individual registering mechanisms and its corresponding actuating device and also operates such corresponding actuating device.

29. A series of individual registering mechanisms, a series of actuating devices therefor, a series of indicators, a handle, and means whereby each movement of such handle, to a different one of two or more predetermined points, establishes an operative relation between a different one of such individual registering mechanisms and its corresponding actuating device and exposes to view the corresponding indicator and also operates such corresponding actuating device.

30. A series of individual registering mechanisms, a series of actuating devices therefor, a total-register, a handle, and means whereby each movement of such handle, to a different one of two or more predetermined points, establishes an operative relation between a different one of such individual registering mechanisms and its corresponding actuating device, actuates such total-register, and operates such corresponding actuating device.

31. A series of individual registering mechanisms, a series of actuating devices therefor, a handle, and means whereby each movement of such handle, to a different one of two or more points in substantially the same path leading one way from a neutral point or position, establishes an operative relation between a different one of such individual registering mechanisms and its corresponding actuating device and also operates such corresponding actuating device.

32. A series of individual registering mechanisms, a series of actuating devices therefor, a series of indicators, a handle, and means whereby each movement of such handle, to a different one of two or more points in substantially the same path leading one way from a neutral point or position, establishes an operative relation between a different one of such individual registering mechanisms and its corresponding actuating device and exposes to view the corresponding indicator and also operates such corresponding actuating device.

33. A series of individual registering mechanisms, a series of actuating devices therefor, a total-register, a handle, and means whereby each movement of such handle, to a different one of two or more points in substantially the same path leading one way from a neutral point or position, establishes an operative relation between a different one of such individual registering mechanisms and its corresponding actuating device, actuates such total-register, and also operates such corresponding actuating device.

34. A series of individual registering mechanisms and a corresponding series of actuating devices therefor, a common operating device for such actuating devices, a handle, and means whereby each one of two or more movements of such handle, differing in amount, establishes an operative relation between that one of such individual registering mechanisms and its corresponding actuating device determined upon by the amount of such movement.

35. A series of individual registering mechanisms and a corresponding series of actuating devices therefor, a series of indicators, a common operating device for such actuating devices, a handle, and means whereby each one of two or more movements of such handle, differing in amount, establishes an operative relation between that one of such individual registering mechanisms and its corresponding actuating device determined upon by the amount of such movement, and also exposes to view the corresponding indicator.

36. A series of individual registering mechanisms and a corresponding series of actuating devices therefor, a total-register, a common operating device for such actuating devices, a handle, and means whereby each one of two or more movements of such handle, differing in amount, establishes an operative relation between that one of such individual registering mechanisms and its corresponding actuating device determined upon by the amount of such movement, and also operates such total-register.

37. A series of individual registering mechanisms and a corresponding series of actuating devices therefor, a common operating device for such actuating devices, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement.

38. A series of individual registering mechanisms and a corresponding series of actuating devices therefor, a series of indicators, a common operating device for such actuating devices, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement, and also exposes to view the corresponding indicator.

39. A series of individual registering mechanisms and a corresponding series of actuating devices therefor, a total-register, a common operating device for such actuating devices, a handle, and means whereby each one of two or more movements of such handle, differing in amount but in substantially the same path leading one way from a neutral point or position, establishes an operative relation between that one of such individual registering mechanisms and its corresponding actuating device determined upon by the amount of such movement, and also operates such total-register.

40. A series of individual registering mechanisms and a corresponding series of actuating devices therefor, a common operating device for such actuating devices, a handle, and means whereby each movement of such handle, to a different one of two or more predetermined points, establishes an operative relation between a different one of such individual registering mechanisms and its corresponding actuating device.

41. A series of individual registering mechanisms and a corresponding series of actuating devices therefor, a series of indicators, a common operating device for such actuating devices, a handle, and means whereby each movement of such handle, to a different one of two or more predetermined points, establishes an operative relation between a different one of such individual registering mechanisms and its corresponding actuating device, and also exposes to view the corresponding indicator.

42. A series of individual registering mechanisms and a corresponding series of actuating devices therefor, a total-register, a common operating device for such actuating devices, a handle, and means whereby each movement of such handle, to a different one of two or more predetermined points, establishes an operative relation between a different one of such individual registering mechanisms and its corresponding actuating device, and also operates such total-register.

43. A series of individual registering mechanisms and a corresponding series of actuating devices therefor, a common operating device for such actuating devices, a handle, and means whereby each movement of such handle, to a different one of two or more points in substantially the same path leading one way from a neutral point or position, establishes an operative relation between a different one of such individual registering mechanisms and its corresponding actuating device.

44. A series of individual registering mechanisms and a corresponding series of actuating devices therefor, a series of indicators, a common operating device for such actuating devices, a handle, and means whereby each movement of such handle, to a different one of two or more points in substantially the same path leading one way from a neutral point or position, establishes an operative relation between a different one of such individual registering mechanisms and its corresponding actuating device, and also exposes to view the corresponding indicator.

45. A series of individual registering mechanisms and a corresponding series of actuating devices therefor, a total-register, a common operating device for such actuating devices, a handle, and means whereby each movement of such handle, to a different one of two or more points in substantially the same path leading one way from a neutral point or position, establishes an operative relation between a different one of such individual registering mechanisms and its corresponding actuating device, and also operates such total-register.

46. A series of registering mechanisms, a series of independently-movable parts each arranged to actuate its corresponding registering mechanism, a common operating device for such independently-movable parts, a handle, and means whereby each one of two or more movements of such handle, differing in amount but in substantially the same path leading one way from a neutral point or position, establishes an operative relation between that one of such independently-movable parts and such common operating device determined by the amount of such motion and also actuates such common operating device.

47. A series of registering mechanisms, a series of independently-movable parts each arranged to actuate its corresponding registering mechanism, a series of indicators, a common operating device for such independently-movable parts, a handle, and means whereby each one of two or more movements of such handle, differing in amount but in substantially the same path leading one way from a neutral point or position, establishes an operative relation between that one of such independently-movable parts and such common operating device determined by the amount of such motion, and exposes to view the corresponding indicator, and also actuates such common operating device.

48. A series of registering mechanisms, a series of independently-movable parts each arranged to actuate its corresponding registering mechanism, a total-register, a common operating device for such independently-movable parts arranged to operate such total-register, a handle, and means whereby each one of two or more movements of such handle, differing in amount but in substantially the same path leading one way from a neutral point or position, establishes an operative relation between that one of such independently-movable parts and such common operating device determined by the amount of such motion, and also actuates such common operating device.

49. A series of registering mechanisms, a series of independently-movable parts each arranged to actuate its corresponding registering mechanism, a common operating device for such independently-movable parts, a total-register, a handle, and means whereby each one of two or more movements of such handle, differing in amount but in substantially the same path leading one way from a neutral point or position, establishes an operative relation between that one of such independently-movable parts and such common operating device determined by the amount of such motion, and also actuates such common operating device and such total-register.

50. A series of registering mechanisms, a series of independently-movable parts each arranged to actuate its corresponding registering mechanism, a common operating device for such independently-movable parts, a handle, and means whereby each movement of such handle, to a different one of two or more points in substantially the same path leading one way from a neutral point or position, establishes an operative relation between a different one of such independently-movable parts and such common operating device and also actuates such common operating device.

51. A series of registering mechanisms, a series of independently-movable parts each arranged to actuate its corresponding registering mechanism, a series of indicators, a common operating device for such independently-movable parts, a handle, and means whereby each movement of such handle, to a different one of two or more points in substantially the same path leading one way from a neutral point or position, establishes an operative relation between a different one of such independently-movable parts and such common operating device and actuates such common operating device and also exposes to view the corresponding indicator.

52. A series of registering mechanisms, a series of independently-movable parts each arranged to actuate its corresponding registering mechanism, a total-register, a common operating device for such independently-movable parts arranged to operate such total-register, a handle, and means whereby each movement of such handle, to a different one of two or more points in substantially the same path leading one way from a neutral point or position, establishes an operative relation between a different one of such independently-movable parts and such common operating device and also actuates such common operating device.

53. A series of registering mechanisms, a series of independently-movable parts each arranged to actuate its corresponding registering mechanism, a common operating device for such independently-movable parts, a total-register, a handle, and means whereby each movement of such handle, to a different one of two or more points in substantially the same path leading one way from a neutral point or position, establishes an operative relation between a different one of such independently-movable parts and such common operating device, and also actuates such common operating device, and such total-register.

54. A series of registering mechanisms, a series of independently-movable parts each arranged to actuate its corresponding registering mechanism, a common operating device for such independently-movable parts, a handle, and means whereby each movement of such handle, by the shortest path to a different one of two or more points, establishes an operative relation between a different one of such independently-movable parts and such common operating device and also actuates such common operating device, such common operating device having one and the same fixed path of movement for each one of such movements of such handle.

55. A series of registering mechanisms, a series of independently-movable parts each arranged to actuate its corresponding registering mechanism, a series of indicators, a common operating device for such independently-movable parts, a handle, and means whereby each movement of such handle, by the shortest path to a different one of two or more points, establishes an operative relation between a different one of such independently-movable parts and such common operating device and actuates such common operating device and also exposes to view the corresponding indicator, such common operating device having one and the same fixed path of movement for each one of such movements of such handle.

56. A series of registering mechanisms, a series of independently-movable parts each arranged to actuate its corresponding registering mechanism, a total-register, a common operating device for such independently-movable parts and arranged to operate such total-register, a handle, and means whereby each movement of such handle, by the shortest path to a different one of two or more points, establishes an operative relation between a different one of such independently-movable parts and such common operating device and also actuates such common operating device, such common operating device having one and the same fixed path of movement for each one of such movements of such handle.

57. A series of registering mechanisms, a series of independently-movable parts each arranged to actuate its corresponding registering mechanism, a common operating device for such independently-movable parts, a total-register, a handle, and means whereby each movement of such handle, by the shortest path to a different one of two or more points, establishes an operative relation between a different one of such independently-movable parts and such common operating device, and also actuates such common operating device and such total-register, such common operating device having one and the same fixed path of movement for each one of such movements of such handle.

58. A series of individual registering mechanisms and a corresponding series of actuating devices therefor, a common operating device for such actuating devices, a handle, and means whereby each movement of such handle, to a different one of two or more predetermined points, establishes an operative relation between a different one of such individual registering mechanisms and its corresponding actuating device, and also establishes an operative relation between such corresponding actuating device and such common operating device.

59. A series of individual registering mechanisms and a corresponding series of actuating devices therefor, a series of indicators, a common operating device for such actuating devices, a handle, and means whereby each movement of such handle, to a different one of two or more predetermined points, establishes an operative relation between a different one of such individual registering mechanisms and its corresponding actuating device, and establishes an operative relation between such corresponding actuating device and such common operating device, and also exposes to view the corresponding indicator.

60. A series of individual registering mechanisms and a corresponding series of actuating devices therefor, a total-register, a common operating device for such actuating devices, a handle, and means whereby each movement of such handle, to a different one of two or more predetermined points, establishes an operative relation between a different one of such individual registering mechanisms and its corresponding actuating device, and establishes an operative relation between such corresponding actuating device and such common operating device, and also operates such total-register.

61. In a registering mechanism, a series of independent indicators and a common operating device therefor, and means whereby such common operating device, at successive points in the path of its movement, exposes to view one and only one of such independent indicators at a time.

WM. H. COOLEY.

Witnesses:
ALBERT C. BELL,
ETHA M. SMITH.